United States Patent [19]
Brooks et al.

[11] 3,788,429
[45] Jan. 29, 1974

[54] DISC BRAKE AND WHEEL ASSEMBLY

[75] Inventors: Frank W. Brooks; Thomas D. Naismith, both of Dayton, Ohio

[73] Assignee: General Motors Corporation, Detroit, Mich.

[22] Filed: July 14, 1972

[21] Appl. No.: 271,660

[52] U.S. Cl............. 188/18 A, 188/71.1, 188/71.8, 188/73.5, 192/70.17, 192/70.19
[51] Int. Cl............................................... B60t 1/06
[58] Field of Search ...... 188/18 A, 71.1, 71.5, 73.5, 188/71.8; 192/70.17, 70.19, 70.20

[56] References Cited
UNITED STATES PATENTS

| | | | |
|---|---|---|---|
| 1,172,146 | 2/1916 | Loomis | 192/70.2 |
| 1,415,841 | 5/1922 | Seitz | 192/70.2 |
| 3,404,756 | 10/1968 | Swift | 188/72.6 |
| 3,478,844 | 11/1969 | Beuchle | 188/18 A |
| 3,586,132 | 6/1971 | Tantlinger | 188/18 A |
| 3,630,320 | 12/1971 | Lochmann | 188/18 A |

FOREIGN PATENTS OR APPLICATIONS

| | | | |
|---|---|---|---|
| 1,073,362 | 3/1954 | France | 188/18 A |

*Primary Examiner*—George E. A. Halvosa
*Attorney, Agent, or Firm*—D. D. McGraw

[57] ABSTRACT

A disc brake and wheel assembly in which an annular brake disc has axially extending circumferentially spaced lands and grooves formed on its outer peripheral surface, and a brake disc support and drive member, provided as part of the wheel assembly, has a bell-like configuration, the generally radially extending portion of the member being mounted on the wheel assembly hub and the generally cylindrical portion of the member having circumferentially spaced projections received in the disc grooves and engaging the edges of the disc lands in rotary driving and axially relatively movable relation so that the disc is rotatably driven with the wheel assembly and is axially movable in relation thereto for brake adjustment. The brake caliper is of the fixed type, with one axially movable brake shoe and one fixed brake shoe arranged to frictionally engage opposite sides of the brake disc when actuated. A piston and cylinder arrangement in one side of the caliper housing is provided to move the movable brake shoe. It may also have a manually actuated mechanism so that the brake can also function as a parking brake, and may be provided with an automatic adjusting mechanism.

1 Claim, 4 Drawing Figures

DISC BRAKE AND WHEEL ASSEMBLY

The invention relates to an assembly including a disc brake and wheel and, more particularly, to one having a movable disc and fixed caliper, the disc being supported and driven by a part of the wheel assembly.

In the preferred embodiments illustrated and described herein, the disc is annular with splines on its outer periphery interconnecting in rotative driving relation for axial sliding relation with a brake disc support and drive member. Axial sliding movement of the disc permits compensation for brake lining wear. The caliper is open at its radially outward side to receive the disc, the caliper housing extending through the annular opening of the disc adjacent the disc inner periphery to provide for mounting and actuation of brake pad assemblies on opposite sides of the disc. The caliper is preferably formed as a part of a steering knuckle if the assembly relates to a steering wheel, or as part of a fixed bearing housing structure if it relates to a non-steering wheel. A parking brake and shoe adjusting mechanism may be provided. The brake disc support and drive member may either be integrated with the wheel disc in the area in which the wheel disc is attached to the wheel rim, or may be a separate wheel assembly member attached to the wheel hub and providing means for engaging the disc splined periphery in driving and sliding relation. The constructions are particularly adapted to easy brake pad assembly replacement, it only being necessary to use the conventional wheel lug wrench to move the wheel assembly, including the brake disc support and drive member, in order to have ready access to the removable brake pad assemblies.

IN THE DRAWINGS

Figure 1:
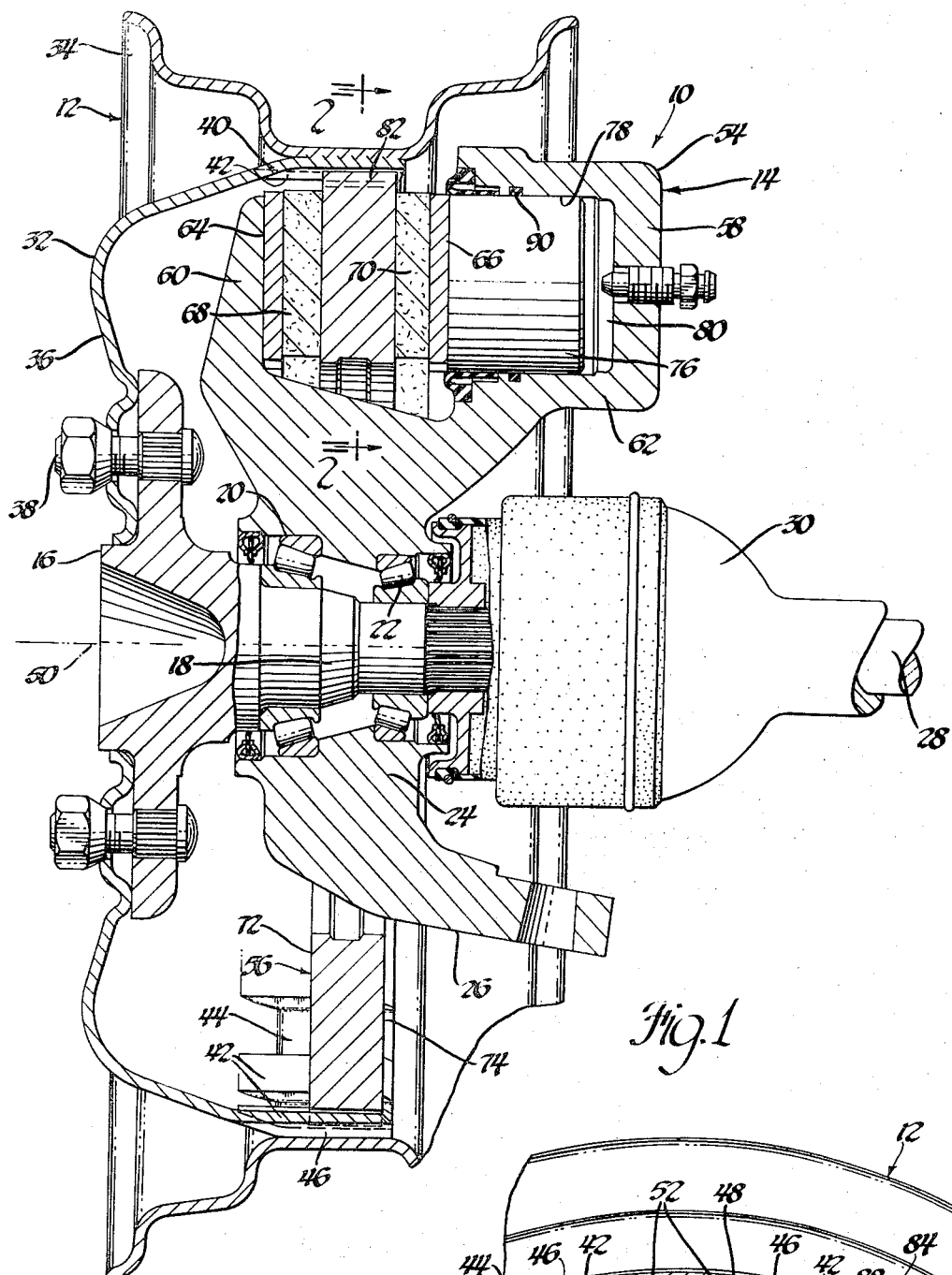
FIG. 1 is a cross-section view, with parts broken away, showing a wheel and brake assembly embodying the invention.
Figure 2:
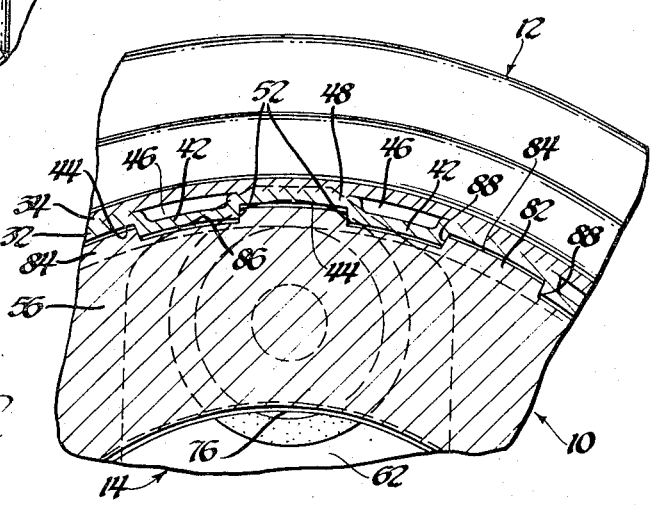
FIG. 2 is a fragmentary cross-section view of the assembly of FIG. 1, taken in the direction of arrows 2—2 of that FIGURE.

The wheel and brake assembly 10 of FIGS. 1 and 2 is illustrated as being a part of a steerable, driving wheel arrangement such as is used on front wheel drive vehicles. However, the assembly is readily adapted to non-steering wheels or non-driving wheels, or wheels which are neither driven nor steered. The assembly 10 includes a wheel assembly 12 and a disc brake assembly 14. The wheel assembly 12 has a hub 16 provided with an axle 18 mounted in suitable bearings 20 and 22. The bearings are received in a non-rotatable bearing housing 24 which, in the particular assembly illustrated, is also a part of the steering knuckle 26. A suitable drive for the wheel assembly 12 is provided by means of shaft 28 and a universal joint 30, suitably connected to stub axle 18 so as to permit steering and driving of the wheel assembly. The wheel assembly also includes a wheel disc 32 and a wheel rim 34. The wheel disc 32 has generally radially extending first section 36 mounted by suitable bolts and nuts 38 to the wheel hub 16, and a generally cylindrical second section 40 integrally formed with the first section 36 and presenting therewith a somewhat bell-like configuration. The wheel rim 34, on which is mounted a tire, not shown, is secured in a suitable manner, such as welding, to the wheel disc second section 40. The outer end of the wheel disc second section 40 is formed to provide a circumferentially extending series of radially inwardly facing lands 42 and grooves 44 in alternating relation. Since the wheel disc 32 is illustrated as being formed of sheet metal, it is readily apparent that provision of the inwardly extending lands 42 results in radially corresponding outwardly facing grooves 46, and the provision of the radially inwardly formed grooves 44 results in radially corresponding outwardly extending lands 48. Therefore, the lands 48, which form the outer sides of grooves 44, are the portions of the wheel disc second section 40 to which the wheel rim 34 is attached. The lands and grooves 42, 44, 46 and 48 extend parallel to the axis 50 about which the wheel assembly rotates. The inwardly extending lands 42 are defined by sides or shoulders 52, which also are axially parallel to the wheel assembly axis 50.

The disc brake assembly 14 includes a caliper assembly 54 and a rotatable brake disc 56. The caliper assembly further includes a housing 58, integrally formed with the bearing housing 24 and steering knuckle 26 to provide caliper legs 60 and 62 positioned on opposite sides of disc 56 and arranged to mount oppositely acting brake pad assemblies 64 and 66 so that the brake pad assembly linings 68 and 70 are engageable with the disc opposite friction surfaces 72 and 74, respectively. The brake pad assembly 64 is suitably mounted on caliper leg 60, and the brake pad assembly 70 is suitably mounted on the caliper leg 62 so as to be engaged by the brake actuating piston 76, which is movable in the brake cylinder 78 formed in caliper housing leg 62, when pressurized brake fluid is provided in the pressure chamber 80. The brake disc 56 has splines 82 formed on its outer periphery as lands 84 and grooves 86 arranged in alternating circumferentially spaced relation. Lands 84 have sides or shoulders 88 which extend axially parallel to the axis 50 and are complementary to the shoulders 52 of lands 42 so as to engage those shoulders in rotative driving relation while permitting axially sliding movement of the brake disc 56 relative to the brake disc support and drive member embodied in the wheel disc 32.

Since the caliper is fixed against axial movement, the brake pad assembly 64 cannot move as the brake lining wears. Therefore, the brake disc 56 is permitted to move axially so that when the brake pad assembly 66 is actuated against the friction surface 74, the brake disc moves to frictionally engage the brake lining 68. As the linings wear, brake disc 56 will move further and further toward caliper leg 60 so as to maintain brake adjustment. Although not shown in FIG. 1, a suitable brake adjusting mechanism may be provided in a manner similar to that of FIG. 3. Brake adjustment may also be provided due to action of the piston seal 90 as the piston 76 moves outwardly in cylinder 78, in a manner well known in the art.

Figure 3:
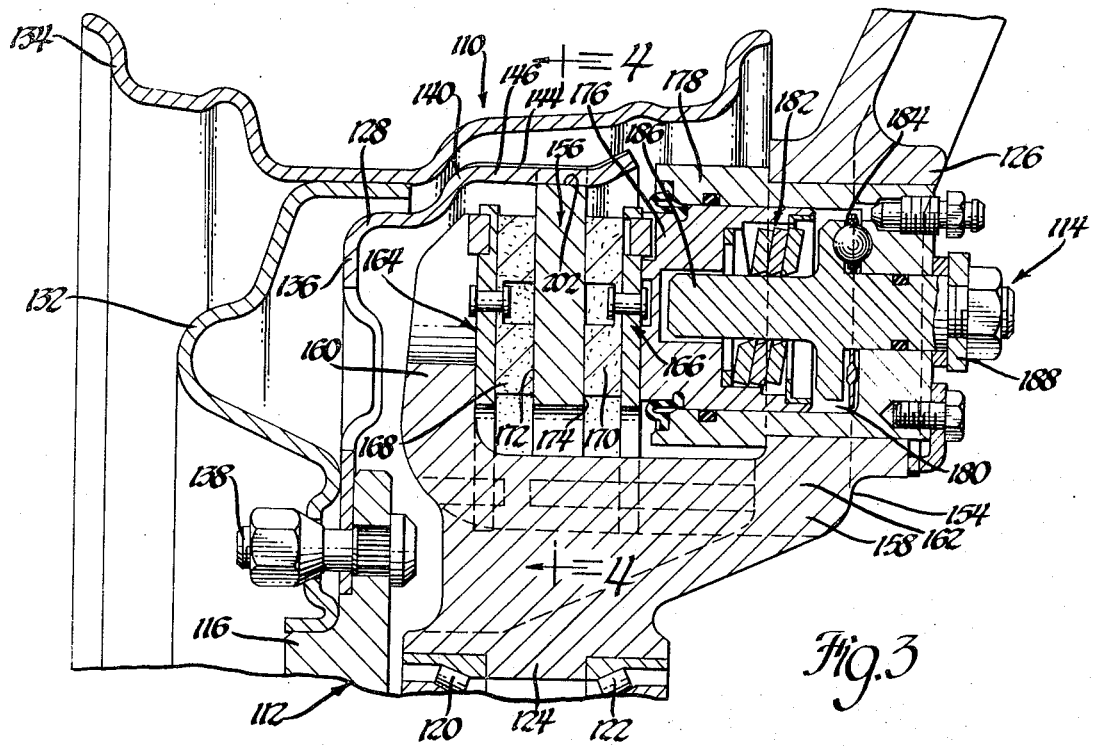
FIG. 3 is a cross-section view of a modification of the assembly of FIG. 1, and is generally similar to that FIGURE.
Figure 4:
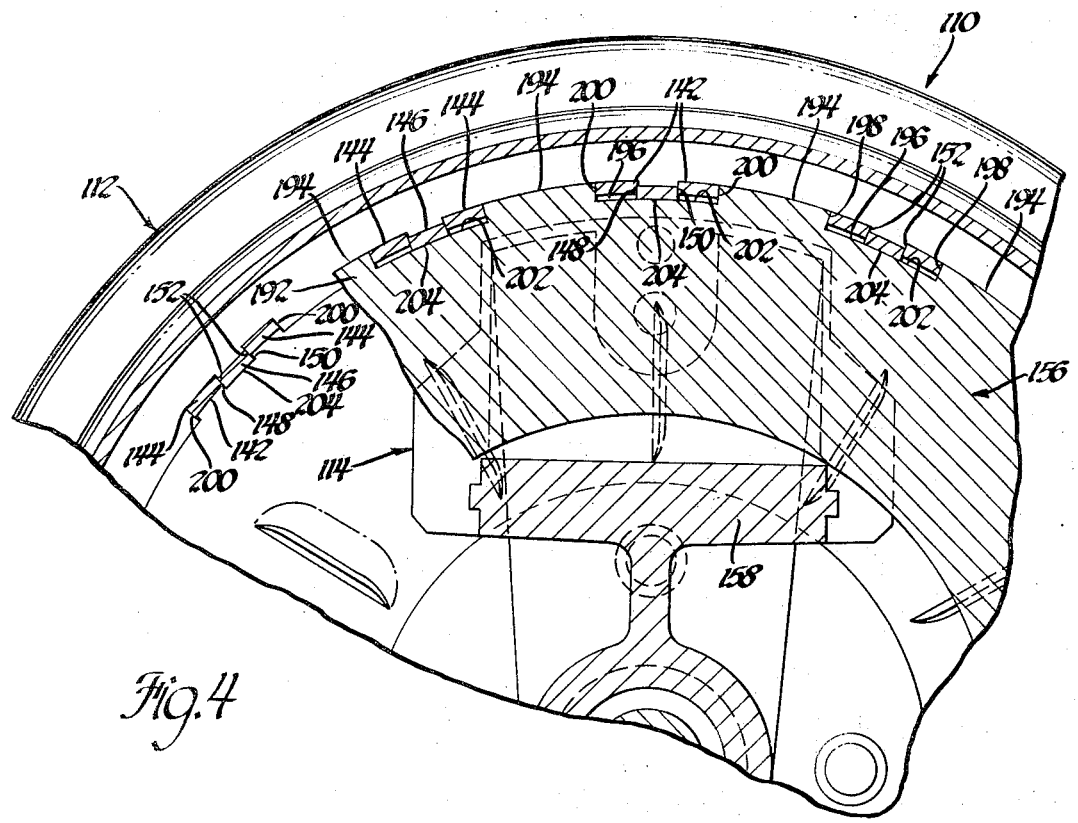
FIG. 4 is a fragmentary cross-section view of the assembly of FIG. 3 taken in the direction of arrows 4—4 of that FIGURE.

The wheel and brake assembly 110 of FIGS. 3 and 4 is illustrated as being part of a steerable wheel. The assembly 110 includes a wheel assembly 112 and a disc brake assembly 114. The wheel assembly 112 has a hub 116 which is mounted to rotate in suitable bearings 120 and 122. The bearings are received in a non-rotatable bearing housing 124 which is also a part of the steering knuckle 126. The wheel assembly also includes a brake disc support and drive member 128, a wheel disc 132, and a wheel rim 134 on which a tire, not shown, is conventionally mounted. The wheel rim is suitably secured to the wheel disc by welding or other appropriate means. The wheel disc 132 has a generally radially extending first section 136 mounted by suitable bolts and nuts 138 to the wheel hub 116 and a generally cylindrical second section 140 integrally formed with the first section 136 and presenting therewith a somewhat bell-like configuration. The outer end of the member's second section 140 is formed to provide a circumferentially repeated series of axially extending fingers or tabs, the tabs being preferably provided in sets of three, each set 142 having a pair of outer tabs or fingers 144 and an intermediate tab or finger 146. Each set of tabs or fingers is positioned in circumferentially spaced relation to the adjacent set. The tabs or fingers are formed as cantilever springs and extend generally parallel to the axis of rotation of the hub 116 with their outer ends being bent slightly outward to have a camming action for ease of brake disc installation. They have sides or edges so arranged that the sides 148 and 150 of each intermediate finger engaged the immediately adjacent sides 152 of the outer fingers 144 in friction damping relation. Also, each intermediate finger 146 is offset radially relative to the two outer fingers 144 of each set 142 so that the fingers are not in any exact circumferential alignment, the circumferential surfaces of the intermediate fingers being radially spaced from the comparable circumferential surfaces of their adjacent outer fingers. When the disc brake assembly used includes a brake disc supported on its outer periphery as disclosed in the drawings, the intermediate finger 146 of each set is preferably offset slightly radially inward in relation to the adjacent outer fingers 144.

The disc brake assembly 114 includes the caliper assembly 154 and a rotatable brake disc 156. The caliper assembly further includes a housing 158 which is integrally formed with the bearing housing 124 and the steering knuckle 126 to provide caliper legs 160 and 162 positioned on opposite sides of brake disc 156. The caliper legs are arranged to mount oppositely acting brake pad assemblies 164 and 166 so that the brake pad assembly linings 168 and 170 are engageable with the brake disc opposite friction surfaces 172 and 174, respectively. The brake pad assembly 164 is suitably mounted on caliper leg 160, and the brake pad assembly 170 is suitably mounted on the caliper leg 162 so as to be engaged by the brake actuating piston 176. Piston 176 is movable in the brake cylinder 178 which is mounted in the caliper housing leg 162. Piston 176 is moved to actuate the brake when pressurized brake fluid is provided in the pressure chamber 180. A piston adjusting mechanism 182 and a mechanically actuated brake system, including the ball and ramp arrangement 184, pin 186, and lever 188, are also provided. The manually actuated mechanism operates in the manner disclosed in U.S. application Ser. No. 195,285, filed Nov. 3, 1971 now U.S. Pat. No. 3,724,605 issued Apr. 3, 1973, entitled "Disc Brake With Integral Parking Brake," and assigned to the common assignee. It provides for axial movement of the pin 186 toward the brake disc 156 when lever 188 is rotated, the end of the pin operatively moving the brake pad assembly 166 into braking engagement with the brake disc. The adjusting mechanism 182 permits only limited retraction of the piston 176 upon hydraulic brake release so as to maintain the brake in adjustment at all times. Since the specific operation of the adjusting mechanism need not be described in detail herein, reference is made to the above-noted patent application for further details. Other known types of adjusting mechanisms and manually actuated mechanisms may also be utilized, those illustrated herein being merely by way of example.

The brake disc 156 has splines 192 formed on its outer periphery as lands 194 and grooves 196 arranged in alternating circumferentially spaced relation. Lands 194 have sides or shoulders 198 which extend axially parallel to the axis of rotation of the disc and are complementary to the outer sides or shoulders 200 of the outer tabs or fingers 144 so as to engage those shoulders in rotative driving relation while permitting axially sliding movement of the brake disc 156 relative to the brake disc support and drive member 128. The brake disc grooves 196 have bottom surfaces 202 which are forcibly engaged by the inner circumferentially extending surface 204 of each intermediate finger 146. These fingers act against the brake disc to prevent the disc from rattling, and are assisted by the friction damping action between edges of the intermediate and outer fingers and the outer fingers and the brake disc lands. Similarly, other brake noises tend to be damped out.

Since the brake caliper is fixed against axial movement, the brake disc 156 is permitted to move axially on finger sets 142 as the brake linings wear and the brakes are actuated, thus permitting the maintenance of brake adjustment. When the brake pad assemblies require replacement, the wheel assembly is removed and the brake pad assemblies may be readily removed and replaced without special tools.

What is claimed is:

1. A disc brake and wheel assembly comprising:
   an annular brake disc having opposed annular friction surfaces and a peripheral surface, axially extending circumferentially spaced lands and grooves formed on said peripheral surface in alternating arrangement;
   means selectively frictionally engaging said disc friction surfaces; and
   a wheel assembly having a hub and a rim and a brake disc support and drive member, said member having a generally radially extending first section mounted on said hub and a generally cylindrical second section integrally formed with said first section, said member second section having circumferentially spaced projections received in said disc grooves and engaging the edges of said disc lands in rotary driving and axially relatively movable relation whereby said disc is rotatably driven with said wheel assembly and axially movable in relation thereto for brake adjustment,
   said wheel assembly further having a wheel disc section axially adjacent said brake disc support and drive member and secured to said hub and said rim, said brake disc support and drive member being radially inward of and spaced from said rim, said brake disc support and drive member projections being axially extending fingers, each of said brake disc grooves receiving a set of three of said axially extending fingers, each set of three fingers having the edges of the intermediate finger engaging the adjacent edges of the two outer fingers in friction damping relation, the intermediate finger being offset radially relative to the two outer fingers, the other edges of the two outer fingers engaging the adjacent edges of said brake disc lands in friction damping relation, at least one of the three fingers of each set forcibly engaging the bottom of the brake disc groove, said friction damping relations existing in the brake released and actuated conditions.

* * * * *